United States Patent [19]

Liang

[11] Patent Number: 5,480,357
[45] Date of Patent: Jan. 2, 1996

[54] FREEWHEEL ASSEMBLY FOR BICYCLE

[76] Inventor: Tzong T. Liang, No. 51 Shui-Yuan Rd., Feng-Yuan City, Taichung County, Taiwan

[21] Appl. No.: 390,309

[22] Filed: Jan. 3, 1995

[51] Int. Cl.⁶ .................................................. F16H 9/06
[52] U.S. Cl. ............................ 474/77; 474/160; 474/164
[58] Field of Search ............................ 474/72, 152, 160, 474/164, 77; 280/236; 74/594.3

[56] References Cited

U.S. PATENT DOCUMENTS

| | | | |
|---|---|---|---|
| 4,102,215 | 7/1978 | Nagano et al. | 474/160 |
| 4,230,212 | 10/1980 | Tsuchie et al. | 474/160 X |
| 4,296,850 | 10/1981 | Isobe | 474/160 X |
| 4,580,670 | 4/1986 | Nagano | 474/160 X |
| 4,869,710 | 9/1989 | Iwasaki | 474/160 |
| 5,292,286 | 3/1994 | Lan | 474/160 X |

*Primary Examiner*—Roger J. Schoeppel
*Attorney, Agent, or Firm*—Morton J. Rosenberg; David I. Klein

[57] ABSTRACT

A freewheel of a bicycle includes a number of sprockets engaged on a sprocket ring. An outer thread is formed in the outer portion of the sprocket ring for engaging with a lock nut. The lock nut includes a number of serrated teeth formed on one side surface. An outermost sprocket includes an outer surface having an annular shoulder so as to define an annular surface. The annular surface includes a number of serrated teeth for engaging with the serrated teeth of the lock nut so as to solidly and stably securing the sprocket to the lock nut.

1 Claim, 2 Drawing Sheets the
FREEWHEEL ASSEMBLY FOR BICYCLE

BACKGROUND OF THE INVENTION

1. Field of the Invention

The present invention relates to a freewheel, and more particularly to a freewheel assembly for bicycles.

2. Description of the Prior Art

A typical freewheel for bicycle is disclosed in U.S. Pat. No. 4,869,710 to Iwasaki and comprises a number of sprockets engaged on a sprocket ring, and a nut member engaged on the outer portion of the sprocket ring for securing the sprockets in place. However, the nuts may not stably retain the sprockets in place.

The present invention has arisen to mitigate and/or obviate the afore-described disadvantages of the conventional freewheel assemblies for bicycles.

SUMMARY OF THE INVENTION

The primary objective of the present invention is to provide a freewheel assembly in which the nut member may stably retain the sprockets in place.

In accordance with one aspect of the invention, there is provided a freewheel assembly, comprising a sprocket ring including an outer peripheral portion having a plurality of ribs formed thereon so as to define a plurality of channels therebetween, the sprocket ring including an outer portion having an outer thread formed thereon, at least one sprocket including a bore formed therein for engaging with the sprocket ring and including a plurality of projections radially extended inward for engaging with the channels so as to secure the sprocket to the sprocket ring, the sprocket including an annular shoulder formed therein so as to define an annular surface, the annular surface including a plurality of first serrated teeth formed thereon, and a lock nut including an inner thread formed therein for engaging with the outer thread of the sprocket ring and including a side surface having a plurality of second serrated teeth for engaging with the first serrated teeth so as to solidly and stably securing the sprocket in place.

Further objectives and advantages of the present invention will become apparent from a careful reading of a detailed description provided hereinbelow, with appropriate reference to accompanying drawings.

DETAILED DESCRIPTION OF THE PREFERRED EMBODIMENT

Figure 1:
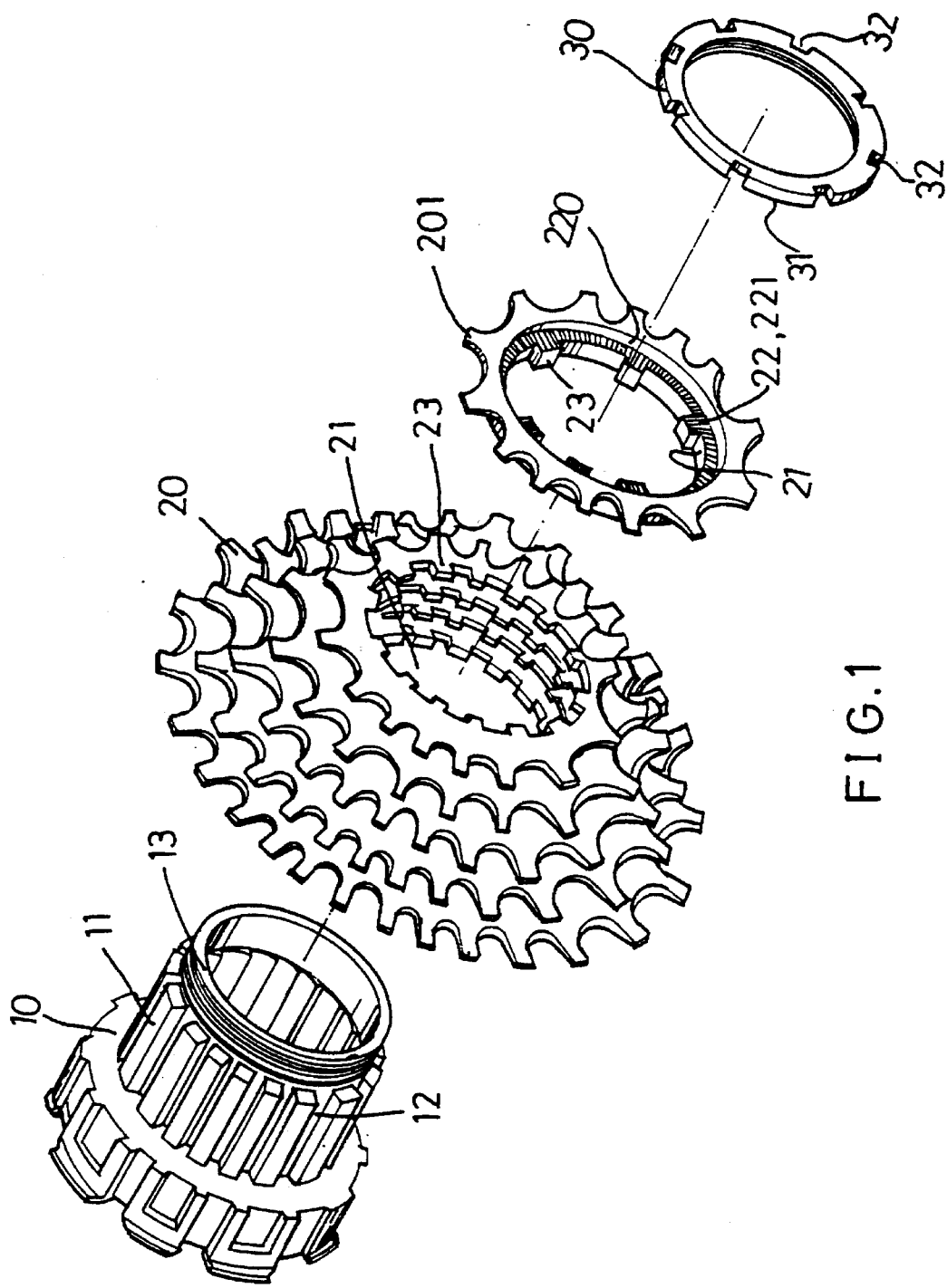
FIG. 1 is an exploded view of a freewheel assembly in accordance with the present invention.
Figure 2:
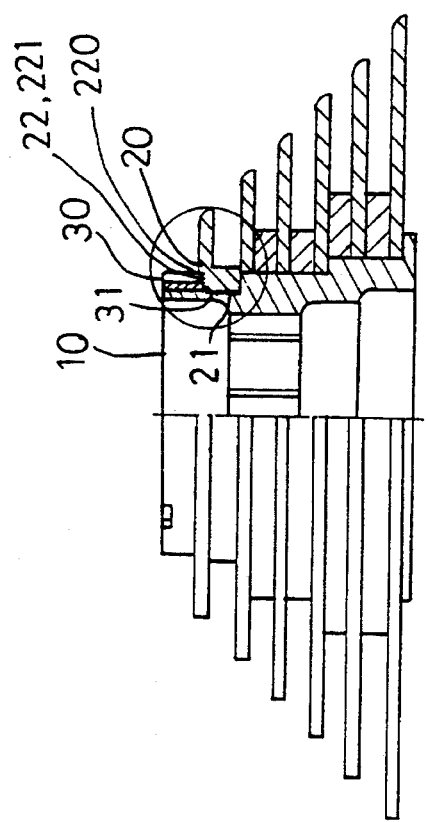
FIG. 2 is a partial cross sectional view of the freewheel assembly.

Referring to the drawings, and initially to FIGS. 1 and 2, a freewheel assembly in accordance with the present invention comprises a sprocket ring 10 including a number of ribs 11 longitudinally formed on the outer peripheral portion so as to define a number of channels 12 therebetween. The sprocket ring 10 includes an outer end portion having an outer thread 13 formed thereon. A number of sprockets 20 each includes a bore 21 formed therein for engaging with the sprocket ring 10 and each includes a number of protrusions 23 extended radially inward for engaging with the channels 12 of the sprocket ring 10 so as to be secured to the sprocket ring 10.

Figure 3:
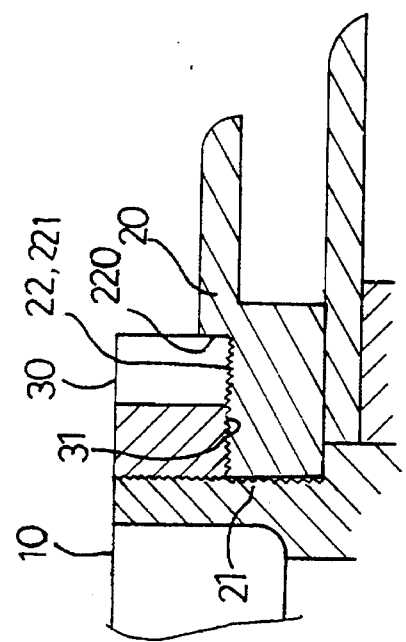
FIG. 3 is an enlarged partial cross sectional view illustrating portion of the freewheel assembly.

The outermost sprocket 201 further includes an annular shoulder 220 formed therein and facing away from the sprocket ring 10 for engaging with a lock nut 30. The lock nut 30 includes an inner thread for engaging with the outer thread 13 of the sprocket ring 10. The annular shoulder 220 includes an annular surface 22 for engaging with the lock nut 30 and includes a plurality of serrated teeth 221 formed thereon for engaging with serrated teeth 31 which are formed on one side surface of the lock nut 30 such that the lock nut 30 may be solidly secured to the outermost sprocket 201, best shown in FIG. 3. The lock nut 30 includes a number of notches 32 formed in the outer peripheral surface for engaging with tools which are provided for rotating the lock nut 30 and for securing the lock nut 30 to the sprocket ring 10.

It is to be noted that the sprockets 20, 201 suffer great force such that the protrusions 23 and the ribs 11 may be damaged. The engagement of the serrated teeth 221, 31 may solidly secure the lock nut 30 to the sprocket 201 such that the sprocket 201 may further be solidly secured in place and such that the sprocket 201 can be prevented from rotating relative to the lock ring 30.

Accordingly, the freewheel assembly in accordance with the present invention includes a lock nut may solidly and stably retain the sprockets in place.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A freewheel assembly comprising:

a sprocket ring including an outer peripheral portion having a plurality of ribs formed thereon so as to define a plurality of channels therebetween, said sprocket ring including an outer portion having an outer thread formed thereon, at least one sprocket including a bore formed therein for engaging with said sprocket ring and including a plurality of projections radially extended inward for engaging with said channels so as to secure said sprocket to said sprocket ring, said sprocket including an annular shoulder formed therein so as to define an annular surface, said annular surface including a plurality of first serrated teeth formed thereon, and a lock nut including an inner thread formed therein for engaging with said outer thread of said sprocket ring and including a side surface having a plurality of second serrated teeth for engaging with said first serrated teeth so as to solidly and stably securing said sprocket in place.

* * * * *